(12) United States Patent
Meyer et al.

(10) Patent No.: US 7,144,930 B2
(45) Date of Patent: *Dec. 5, 2006

(54) FUNCTIONALIZED, STRUCTURALLY MODIFIED SILICAS

(75) Inventors: Jürgen Meyer, Stockstadt/Main (DE); Manfred Ettlinger, Karlstein (DE); Stephanie Frahn, Haibach (DE)

(73) Assignee: Degussa AG, Düsseldorf (DE)

( * ) Notice: Subject to any disclaimer, the term of this patent is extended or adjusted under 35 U.S.C. 154(b) by 497 days.

This patent is subject to a terminal disclaimer.

(21) Appl. No.: 09/981,718

(22) Filed: Oct. 19, 2001

(65) Prior Publication Data

US 2002/0077388 A1    Jun. 20, 2002

(30) Foreign Application Priority Data

Oct. 21, 2000    (EP)    ................... 00122955

(51) Int. Cl.
*C08K 3/34*    (2006.01)
(52) U.S. Cl. .............. 523/216; 524/493; 106/490
(58) Field of Classification Search .......... 423/335; 523/216; 524/492, 493; 106/490
See application file for complete search history.

(56) References Cited

U.S. PATENT DOCUMENTS

| | | | |
|---|---|---|---|
| 4,644,077 A | 2/1987 | Gupta | |
| 4,877,595 A | 10/1989 | Klingle et al. | 423/335 |
| 5,063,003 A * | 11/1991 | Gonzalez-Oliver | 264/14 |
| 5,654,090 A * | 8/1997 | Kayanoki | 428/329 |
| 5,719,220 A * | 2/1998 | Kirtley | 524/267 |
| 5,858,077 A | 1/1999 | Kayanoki | |
| 5,959,005 A | 9/1999 | Hartmann et al. | 523/213 |
| 6,017,971 A * | 1/2000 | Mizoguchi et al. | 521/62 |
| 6,193,795 B1 | 2/2001 | Nargiello et al. | 106/484 |
| 6,197,863 B1 | 3/2001 | Eck et al. | 524/430 |
| 6,593,393 B1 * | 7/2003 | Frahn et al. | 522/83 |

FOREIGN PATENT DOCUMENTS

| | | |
|---|---|---|
| EP | 0 280 851 | 1/1988 |
| WO | WO 90/02779 | 3/1990 |

OTHER PUBLICATIONS

European Office Action dated May 4, 2001.
Matsumura, Kazuyuki et al., "Surface Treatment of Silica".
Patent No. JP 10-204319, Publication Date: Aug. 4, 1998, Abstract Only.
Patent Abstract of Japan, Publication No. 05-115772, Publication Date: May 14, 1993.
Patent Abstract of Japan, Publication No. 03-021647, Publication Date: Jan. 30, 1991.
Patent Abstract of Japan, Publication No. 06-172674, Publication Date: Jun. 21, 1994.
Patent Abstract of Japan, Publication No. 10-087317, Publication Date: Apr. 7, 1998.
Canadian Application No. 2,359,530, Issued: Aug. 7, 2001.
Canadian Office Action dated Jun. 3, 2004.

* cited by examiner

*Primary Examiner*—Edward J. Cain
(74) *Attorney, Agent, or Firm*—Smith, Gambrell & Russell, LLP

(57) ABSTRACT

Functionalized, structurally modified silicas with 3-methacryloxypropylsilyl and/or glycidyloxypropylsilyl groups on the surface are prepared by mixing the silicas with the silane and heat-treating, destructuring and grinding the mixture. The silicas are employed in radiation-curing coatings.

6 Claims, No Drawings

FUNCTIONALIZED, STRUCTURALLY MODIFIED SILICAS

INTRODUCTION AND BACKGROUND

The present invention relates to functionalized, structurally modified silicas, a process for their preparation and their use.

It is known to react silicon dioxide obtained by flame hydrolysis and with a surface area of 40 to 200 $m^2/g$ with 3-methacryloxypropyl-trimethoxysilane. The resulting silicon dioxide is then coated with a further shell of (meth) acrylate polymers and subsequently employed in dental compositions (EP 0 142 784 A1).

It is known to silanize a silica with hexamethyldisilazane and then to destructure or to compact it by mechanical effects (EP 0 808 880 A2).

The known silica has the disadvantage that it can be incorporated into coating systems only with difficulty or not at all because its thickening effect is too high.

It is therefore an object of the present invention to develope a functionalized, structurally modified silica which does not have this disadvantage.

SUMMARY OF THE INVENTION

The above and other objects of the present invention can be achieved by functionalized, structurally modified silicas, characterized by functional groups fixed on the surface, the groups being 3-methacryloxypropylsilyl and/or glycidyloxypropylsilyl, with the following physico-chemical characteristic data:

| | | |
|---|---|---|
| BET surface area | $m^2/g$ | 25–380 |
| Particle size | nm | 6–45 |
| Tamped density | g/l | 50–400 |
| pH | | 3–10 |
| Carbon content | % | 0.1–15 |
| DBP (dibutylphthalate) number | % | <200 |

The present invention also provides a process for the preparation of the functionalized, structurally modified silicas according to the invention, which is characterized in that a silica is sprayed optionally first with water or dilute acid and then with a surface modification reagent or a mixture of several surface modification reagents in a suitable mixing vessel, with intensive mixing, the components are optionally re-mixed for 15 to 30 minutes and heat-treated at a temperature of 100 to 400° C. over a period of 1 to 6 h, and the functionalized silica is then destructured/compacted by mechanical effects and optionally re-ground in a mill.

According to the invention, a ball mill, for example, can be employed for the destructuring. The re-grinding can be carried out, for example, by means of an air jet mill or pinned disc mill.

A silica prepared pyrogenically by the route of flame hydrolysis of SiCl4 can preferably be employed as the silica. Such pyrogenic silicas are known from Ullmanns Enzyklopädie der technischen Chemie [Ullmanns Encyclopaedia of Industrial Chemistry], 4th edition, volume 21, page 464 (1982).

In a preferred embodiment of the invention, a pyrogenic silica with a surface area of approx. 200 $m^2/g$ can be reacted (Aerosil® 200).

Monomeric substances, such as the organo alkoxysilanes, e.g., 3-methacryloxypropyl-trialkoxysilane and/or glycidyloxypropyltrialkoxysilane, wherein alkoxy can be methoxy, ethoxy and/or propoxy, can be employed as the surface modification reagent.

The amount of silane can be metered in with respect to the silica such that no excess results. The excess silane can optionally be removed during the heat treatment.

The silica according to the invention can be employed in radiation-curing coatings containing a binder vehicle, for example UV coatings.

The scratch resistance of the surfaces is advantageously improved by the use of the silica according to the invention.

The silicas according to the invention have only a slight influence on the rheology of the coating system. Because the viscosity of the coating is increased only slightly, relatively large amounts of silica can be incorporated into the coating.

The functional groups on the silica can react with organic compounds.

According to the invention, the pyrogenically prepared silicas according to table 1 can be employed as the silica for the silanization.

TABLE 1

Physico-chemical data of AEROSIL

| Test method | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| Behaviour towards water | | hydrophilic | | | | | | | |
| Appearance | | loose white powder | | | | | | | |
| Bet surface area[1] | $m^2/g$ | 90 ± 15 | 130 ± 25 | 150 ± 15 | 200 ± 25 | 300 ± 30 | 380 ± 30 | 50 ± 15 | 200 ± 50 |
| Average primary particle size | nm | 20 | 16 | 14 | 12 | 7 | 7 | 40 | 40 |
| Tamped density approx. values[2] | g/l | 80 | 50 | 50 | 50 | 50 | 50 | 130 | 60 |
| Compacted goods (added "V") | g/l | 120 | 120 | 120 | 120 | 120 | 120 | | |
| VV goods (added "VV")[12] | g/l g/l | | | 50/75 | 50/75 120 | 50/75 120 | | | |
| Loss on drying[3] (2 hours at 105° C.) on leaving supply works | % | <1.0 | <1.5 | <0.5[9] | <1.5 | <1.5 | <2.0 | <1.5 | <2.5 |
| Loss on ignition[4][7] (2 hours at 1000° C.) | % | <1 | <1 | <1 | <1 | <2 | <2.5 | <1 | <2.5 |
| pH[5] | | 3.7–4.7 | 3.7–4.7 | 3.7–4.7 | 3.7–4.7 | 3.7–4.7 | 3.7–4.7 | 3.8–4.8 | 3.6–4.5 |

TABLE 1-continued

Physico-chemical data of AEROSIL

| Test method | | AEROSIL 90 | AEROSIL 130 | AEROSIL 150 | AEROSIL 200 | AEROSIL 300 | AEROSIL 380 | AEROSIL OX 50 | AEROSIL TT 600 |
|---|---|---|---|---|---|---|---|---|---|
| $SiO_2$[8] | % | >99.8 | >99.8 | >99.8 | >99.8 | >99.8 | >99.8 | >99.8 | >99.8 |
| $Al_2O_3$[8] | % | <0.05 | <0.05 | <0.05 | <0.05 | <0.05 | <0.05 | <0.08 | <0.05 |
| $Fe_2O_3$[8] | % | <0.003 | <0.003 | <0.003 | <0.003 | <0.003 | <0.003 | <0.01 | <0.003 |
| $TiO_2$[8] | % | <0.03 | <0.03 | <0.03 | <0.03 | <0.03 | <0.03 | <0.03 | <0.03 |
| HCl[8)10] | % | <0.025 | <0.025 | <0.025 | <0.025 | <0.025 | <0.025 | <0.025 | <0.025 |
| Sieve residue[8] (Mocker method, 45 μm) | % | <0.05 | <0.05 | <0.05 | <0.05 | <0.05 | <0.05 | <0.2 | <0.05 |
| Drum size (net)[11] | kg | 10 | 10 | 10 | 10 | 10 | 10 | 10 | 10 |

[1] in accordance with DIN 66131
[2] in accordance with DIN ISO 787/XI, JIS K 5101/18 (not sieved)
[3] in accordance with DIN ISO 787/II, ASTM D 280. JIS K 5101/21
[4] in accordance with DIN 55921, ASTM D 1208, JIS K 5101/23
[5] in accordance with DIN ISO 787/IX, ASTM D 1208, JIS K 5101/24
[6] in accordance with DIN ISO 787/XVIII, JIS K 5101/20
[7] based on the substance dried for 2 hours at 105° C.
[8] based on the substance ignited for 2 hours at 1000° C.
[9] special packaging protecting against moisture
[10] HCl content is a constituent of the loss on ignition
[11] V goods are supplied in sacks of 20 kg
[12] VV goods are currently supplied only from the Rheinfelden works
1. in accordance with DIN 66131
2. in accordance with DIN ISO 787/XI, JIS K 5101/18 (not sieved)
3. in accordance with DIN ISO 787/II, ASTM D 280. JIS K 5101/21
4. in accordance with DIN 55921, ASTM D 1208, JIS K 5101/23
5. in accordance with DIN ISO 787/IX, ASTM D 1208, JIS K 5101/24
6. in accordance with DIN ISO 787/XVIII, JIS K 5101/20
7. based on the substance dried for 2 hours at 105° C.
8. based on the substance ignited for 2 hours at 1000° C.
9. special packaging protecting against moisture
10. HCl content is a constituent of the loss on ignition
11. V goods are supplied in sacks of 20 kg
12. VV goods are currently supplied only from the Rheinfelden works

EXAMPLE 1

Aerosil® 200 is mixed with 4 parts water and 18 parts 3-trimethoxysilyl-propyl methacrylate and the mixture is heat-treated at 140° C. under an inert gas. The silanized silica is then compacted to approx. 250 g/l on a continuously operating vertical ball mill. The silica obtained has the following properties:

| BET [m²/g] | 138 |
|---|---|
| Tamped density [g/l] | 242 |
| pH | 4.6 |
| C content | 5.7 |
| Loss on drying [%] | 0.6 |
| Loss on ignition [%] | 8.9 |
| DBP number [%] | 122 |

Experiments with AEROSIL R 8200 and Silica According to Example 1 in UV-Curing Binders:

Experiment 1:

AEROSIL® is stirred into the binder 1 (ethoxylated pentaerytholtetraacrylate) Sartomer SR 494, Cray Valley, with a dissolver and then predispersed for 5 min at 3000 rpm (disc Ø45 mm). The mixture is dispersed in a laboratory bead mill for 15 min (AEROSIL® 8200) or 20 min (silica according to example 1) at 2500 rpm and a pump output of 60% (AEROSIL® 8200) or 40% (silica according to example 1). 1 mm glass beads are used as the beads. The dispersing quality is checked with a grindometer, 25 μm, in accordance with DIN ISO 1524. It must be smaller than 10 μm.

3% photoinitiator is stirred into the coating. Application is carried out with the aid of a spiral doctor blade (amount applied 36 μm) on black-lacquered metal sheets. Curing is carried out with a UV unit (current uptake of the UV lamp (mercury vapour lamp) 7.5–10 mA, belt speed 10 m/min, irradition intensity 1 W/cm).

Experiment 2:

AEROSIL® is stirred into the binder 2 (epoxyacrylate) with a dissolver and then predispersed for 5 min at 3000 rpm (disc Ø 45 mm). The mixture is dispersed in a laboratory bead mill for 15 min at 2500 rpm and a pump output of 70% (AEROSIL® 8200) or 40% (silica according to example 1). 1 mm glass beads are used as the beads. The dispersing quality is checked with a grindometer, 25 μm, in accordance with DIN ISO 1524. It must be smaller than 10 μm.

3% photoinitiator is stirred into the coating. Application is carried out with the aid of a spiral doctor blade (amount applied 36 μm) on black-lacquered metal sheets. Curing is carried out with a UV unit (current uptake of the UV lamp (mercury vapour lamp) 7.5–10 mA, belt speed 10 m/min, irradition intensity 1 W/cm).

Incorporation of Silica According to R 8200:

Marked foaming is already to be observed during the predispersing (10% AEROSIL® based on binder solids). The viscosity also increases sharply due to the AEROSIL® 8200 (see table 1). The foam is intensified during the dispersing in the bead mill. Application of the coating with a smooth, bubble-free surface is not possible.

Incorporation of Silica According to Example 1:

Slight foaming is to be observed during the predispersing (10% VP based on binder solids), the foam having disappeared after the bead mill dispersing. After application and crosslinking of the film, a smooth, high-gloss surface results.

Grindometer Values, Brookfield Viscosities:

TABLE 2

Grindometer values, Brookfield viscosities:

| | Grindo-meter value [µm] | Viscosity [mPa s] 6 rpm | Viscosity [mPa s] 60 rpm | Pseudo-plasticity 6/60 |
|---|---|---|---|---|
| binder 1 | — | 160 | 158 | 1.0 |
| binder 1 + Aerosil R 8200 | <10 | 35,900 | 6,830 | 5.2 |
| binder 1 + silica according to example 1 | <10 | 451 | 389 | 1.1 |
| binder 2 | — | 481 | 468 | 1.0 |
| binder 2 + Aerosil R 8200 | <10 | 53,300 | 10,000 | 5.3 |
| binder 2 + silica according to example 1 | <10 | 1,000 | 950 | 1.1 |

The metal sheets are scoured with a quartz/water slurry (100 g water+1 g Marlon A 350, 0.25%+5 g Sikron F500) with 100 strokes with the aid of a scouring and washing resistance testing machine (Erichsen). The shine before and 10 min after scouring is determined with a reflectometer (20° incident angle).

TABLE 3

Reflectometer values before and after scratching:

| | 20° reflectometer value before | 20° reflectometer value after | Residual shine [%] |
|---|---|---|---|
| binder 1 | 82.0 | 50.0 | 61.0 |
| binder 1 + silica according to example 1 | 80.5 | 65.2 | 81.0 |
| binder 2 | 89.6 | 46.5 | 51.9 |
| binder 2 + silica according to example 1 | 87.8 | 67.4 | 76.8 |

Further variations and modifications of the foregoing will be apparent to those skilled n the art and are intended to be encompassed by the claims appended hereto.

European application EP 00 122 955.8 is relied on and incorporated herein by reference.

What is claimed is:

1. A functionalized, destructured silica, characterized by functional groups fixed on the surface, the groups being 3-methacryloxypropylsilyl and/or glycidyloxypropylsilyl, with the following physico-chemical characteristic data:

| BET surface area | $m^2/g$ | 25–380 |
|---|---|---|
| Primary particle size | nm | 6–45 |
| Tamped density | g/l | 50–400 |
| pH | | 3–10 |
| Carbon content | % | 0.1–15 |
| DBP number | % | <200 | wherein said silica is produced pyrogenically by flame hydrolysis of $SiCl_4$ prior to surface modification.

2. The functionalized, destructured silica of claim 1 wherein the BET surface area ranges from 90±15 to 380±15.

3. A process for the preparation of functionalized, destructured silica having functional groups fixed on the surface, the groups being 3-methacryloxypropylsilyl and/or glycidyloxypropylsilyl, with the following physico-chemical characteristic data:

| BET surface area | $m^2/g$ | 25–380 |
|---|---|---|
| Primary particle size | nm | 6–45 |
| Tamped density | g/l | 50–400 |
| pH | | 3–10 |
| Carbon content | % | 0.1–15 |
| DBP number | % | <200 | wherein said silica is produced pyrogenically by flame hydrolysis of $SiCl_4$ prior to surface modification, comprising spraying silica first with water or dilute acid and then with a surface modification reagent or a mixture of several surface modification reagents in a mixing vessel, intensively mixing the silica and said reagent, optionally re-mixing the silica for 15 to 30 minutes and then heat-treating at a temperature of 100 to 400° C. over a period of 1 to 6 h, to thereby produce a functionalized silica, then destructuring or compacting said silica and optionally re-grinding said silica in a mill.

4. A coating composition containing the functionalized, destructured silica according to claim 1 in a binder vehicle.

5. A functionalized, structurally modified destructured silica, characterized by functional groups fixed on the surface, the groups being 3-methacryloxypropylsilyl and/or glycidyloxypropylsilyl, with the following physico-chemical characteristic data:

| BET surface area | $m^2/g$ | 25–380 |
|---|---|---|
| Primary particle size | nm | 6–45 |
| Tamped density | g/l | 50–400 |
| pH | | 3–10 |
| Carbon content | % | 0.1–15 |
| DBP number | % | <200, | said functionalized, destructured silica being produced by spraying pyrogenically produced silica first with water or dilute acid and then with at least one of a surface modification reagent selected from the group consisting of 3-methacryloxypropylsilane, glycidoxypropylsilane and mixtures thereof, in a mixing vessel, intensively mixing the silica and said reagent, optionally re-mixing the silica for 15 to 30 minutes and then heat-treating at a temperature of 100 to 400° C. over a period of 1 to 6 h, to thereby produce said functionalized silica.

6. The functionalized, destructured silica according to claim 5, which has been additionally subjected to destructuring or compacting and optionally re-grinding said silica in a mill.

* * * * *